US012593352B2

(12) United States Patent
Cao et al.

(10) Patent No.: US 12,593,352 B2
(45) Date of Patent: Mar. 31, 2026

(54) SYSTEMS AND METHODS FOR RANDOM ACCESS CHANNEL RESOURCE DETERMINATION

(71) Applicant: ZTE CORPORATION, Shenzhen (CN)

(72) Inventors: Wei Cao, Shenzhen (CN); Nan Zhang, Shenzhen (CN); Chenchen Zhang, Shenzhen (CN); Zhen Yang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 385 days.

(21) Appl. No.: 18/163,494

(22) Filed: Feb. 2, 2023

(65) Prior Publication Data

US 2023/0199857 A1     Jun. 22, 2023

Related U.S. Application Data

(63) Continuation of application No. PCT/CN2020/107318, filed on Aug. 6, 2020.

(51) Int. Cl.
*H04W 74/08*      (2024.01)
*H04W 74/00*      (2009.01)
*H04W 74/0833*    (2024.01)
*H04W 74/0836*    (2024.01)

(52) U.S. Cl.
CPC ..... *H04W 74/002* (2013.01); *H04W 74/0866* (2013.01); *H04W 74/0833* (2013.01); *H04W 74/0836* (2024.01)

(58) Field of Classification Search
CPC .......... H04B 7/18513; H04W 56/0045; H04W 74/002; H04W 74/0833; H04W 74/0866; H04W 84/06; H04W 74/0836
See application file for complete search history.

(56) References Cited

U.S. PATENT DOCUMENTS

| | | | |
|---|---|---|---|
| 11,343,857 B2 * | 5/2022 | Taherzadeh Boroujeni ................ H04W 48/10 |
| 11,553,529 B2 * | 1/2023 | Xiong ................... H04L 1/1861 |
| 2020/0245373 A1 | 7/2020 | Xiong et al. |
| 2020/0383141 A1 * | 12/2020 | Lei ................... H04W 74/0833 |

(Continued)

FOREIGN PATENT DOCUMENTS

| | | |
|---|---|---|
| CN | 110876188 A | 3/2020 |
| CN | 111447671 A | 7/2020 |
| EP | 4 061 078 A1 | 9/2022 |

(Continued)

OTHER PUBLICATIONS

Intel Corporation: "Channel structure for 2-step RACH" 3GPP TSG RAN WG1 #96bis; R1-1904280; Apr. 12, 2019; Xi'an, China (11 pages).

(Continued)

*Primary Examiner* — Liton Miah
(74) *Attorney, Agent, or Firm* — Foley & Lardner LLP

(57)     ABSTRACT

Systems and methods for wireless communications are disclosed herein. In some embodiments, a wireless communication method includes indicating, by a base station to a wireless communication device, at least one set of resources for network access and performing, by the base station, a network access procedure with the wireless communication device based on the at least one indicated set of resources for network access.

17 Claims, 12 Drawing Sheets

(56) References Cited

U.S. PATENT DOCUMENTS

2021/0385879 A1* 12/2021 Mahalingam ..... H04W 56/0045

FOREIGN PATENT DOCUMENTS

| EP | 4 090 121 A1 | 11/2022 |
| WO | WO-2019/137939 A1 | 1/2019 |
| WO | WO-2019/082152 A1 | 5/2019 |
| WO | WO-2019/161044 A1 | 8/2019 |
| WO | WO-2020/092059 A1 | 5/2020 |
| WO | WO-2020/154744 A1 | 7/2020 |

OTHER PUBLICATIONS

International Search Report and Written Opinion for PCT Appl. No. PCT/CN2020/107318, mailed May 8, 2021 (8 pages).
Panasonic: "Issues on Timing Advance and RACH for NTN" 3GPP TSG RAN WG1 #96bis; R1-1904591; Apr. 12, 2019; Xi'an, China (3 pages).
ZTE: "Summary of 7.2.1.1 Channel Structure for Two-step RACH" 3GPP TSG RAN WG1 #96; R1-1903435; Mar. 1, 2019; Athens, Greece (28 pages).
Extended European Search Report on EP 20948863.4 dated Jun. 23, 2023 (10 pages).
Ericsson, "On NTN synchronization, random access, and timing advance", 3GPP TSG-RAN WG1 Meeting #99, R1-1912725, Nov. 22, 2019, Reno, USA (24 pages).
First Office Action for CN Appl. No. 202080104152.X, dated Apr. 8, 2025 (with English translation, 24 pages).

* cited by examiner

First Sub-Area    220

Second Sub-Area
230

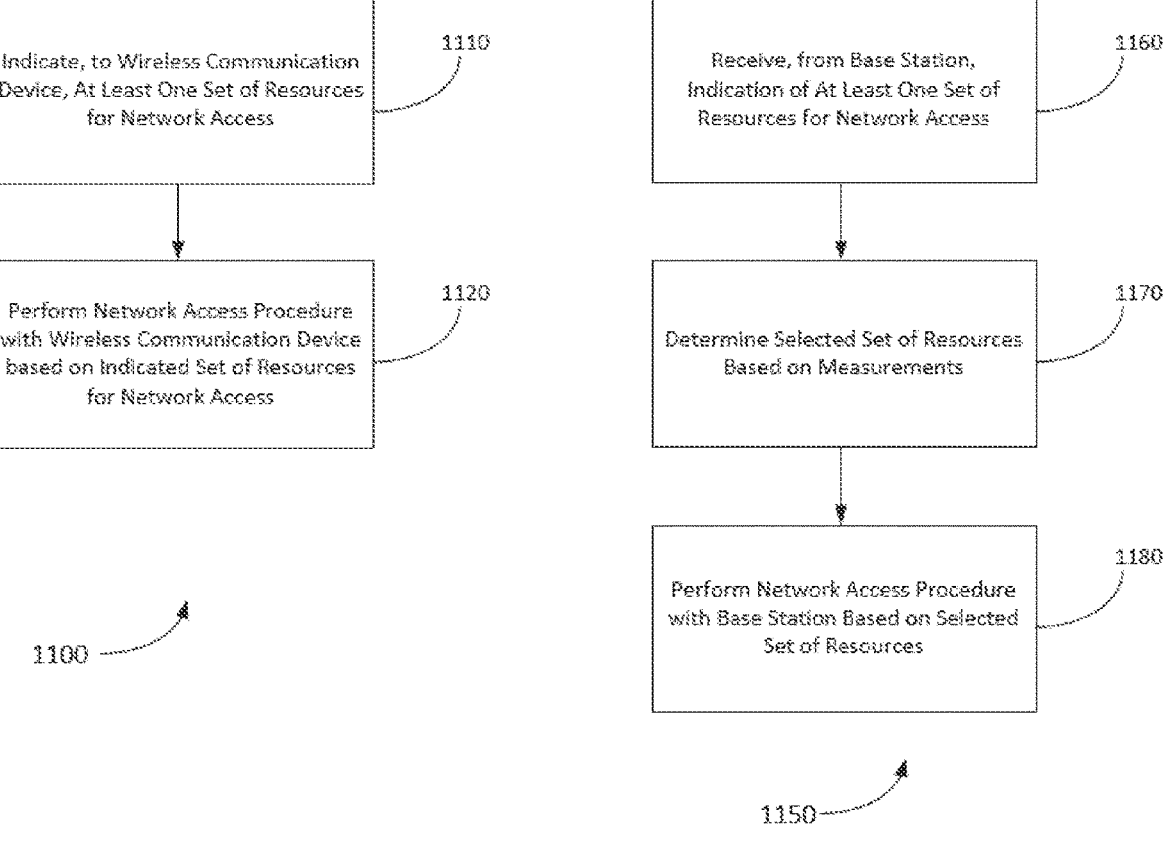
FIG. 11A                    FIG. 11B

SYSTEMS AND METHODS FOR RANDOM ACCESS CHANNEL RESOURCE DETERMINATION

CROSS-REFERENCE TO RELATED APPLICATION

This application claims the benefit of priority under 35 U.S.C. § 120 as a continuation of PCT Patent Application No. PCT/CN2020/107318, filed on Aug. 6, 2020, the disclosure of which is incorporated herein by reference in its entirety.

TECHNICAL FIELD

The present disclosure relates to the field of telecommunications, and in particular, to random access channel occasion determination for a non-terrestrial network.

BACKGROUND

To expand the utilization and coverage of radio access technologies such as but not limited to Long-Term-Evolution (LTE) technologies and New Radio (NR) technologies, connectivity provided by satellites and airborne vehicles has been considered as a promising application. A network incorporating satellites and/or airborne vehicles to perform the functions (either full or partial) of terrestrial Base Stations (BSs) is called a Non-Terrestrial Network (NTN). Satellites and airborne vehicles are collectively referred to as non-terrestrial BSs. Examples of satellites include but are not limited to, Low Earth Orbit (LEO) satellites, and so on. Examples of airborne vehicles include but are not limited to, High-Altitude Platform Stations (HAPS), balloons, Unmanned Aerial Vehicles (UAVs), other suitable airborne vehicles, and so on.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In some arrangements, a BS indicates, to a UE, at least one set of resources for network access and performs a network access procedure with the UE based on the at least one indicated set of resources for network access.

In some arrangements, a UE receives from a BS indication of at least one set of resources for network access, selects a set of resources based on measurements performed by the UE, and performs a network access procedure with the BS based on the selected set of resources.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 11A is a flowchart diagram illustrating an example wireless communication method for determining resources for network access, according to various arrangements.

FIG. 11B is a flowchart diagram illustrating an example wireless communication method for determining resources for network access, according to various arrangements.

DETAILED DESCRIPTION OF EXAMPLE EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

In Non-Terrestrial Networks (NTNs), the coverage of a satellite or an airborne vehicle is generally implemented using multiple beams. For example, the beams of a satellite can sweep across a coverage area as the satellite moves along its orbit. A User Equipment (UE) that is fixed or relatively fixed on the ground is served by different beams of the satellite over time, as the satellite moves. The coverage area of a satellite can be large, e.g., with a single satellite beam footprint diameter of hundreds of kilometers. The number of UEs within the satellite's coverage is likewise expected to be large, and the UEs may have very different elevation angles, which causes different propagation delay and Doppler shift. As such, effectively supporting random access from multiple UEs is a challenging topic in NTN.

In order to reduce signaling overhead and random access delay due to long propagation distance, 2-step RACH is a good candidate in NTN scenarios with only one round of interaction between a Base Station (BS) and UE. In 2-step RACH, the contention-based random access procedure involves only 2 steps. A first message (e.g., MSG_A) containing a preamble and payload is transmitted from the UE to the BS. Then, a second message (e.g., MSG_B) containing a response and other content is transmitted from the BS to the UE. Because the payload is transmitted together with the preamble in the first message, time and frequency synchronization among simultaneous UEs is important to ensure satisfying performance. The difference between a 2-step RACH and a 4-step RACH is that a data-payload resource (for MSG_A transmission) is associated with the RO resource in 2-step RACH.

Figure 1:
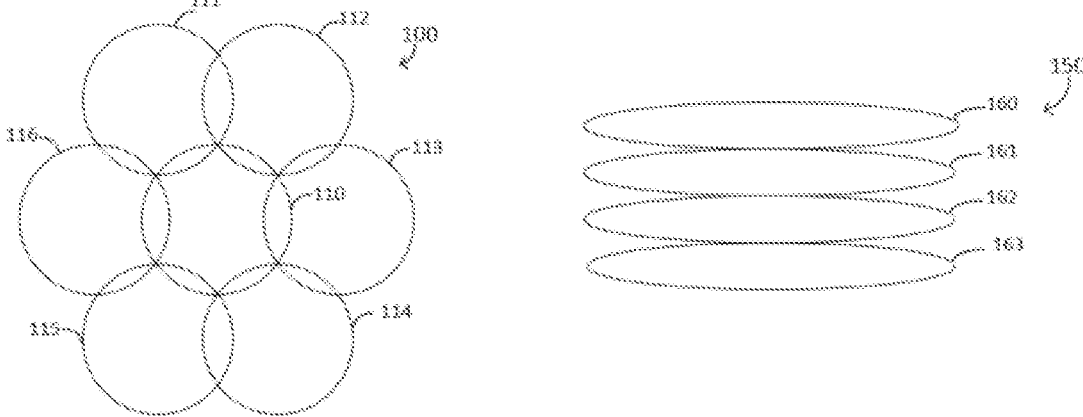
FIG. 1A is a diagram illustrating beams of a cell of a BS in a wireless communication system, according to various arrangements.
FIG. 1B is a diagram illustrating beams of a cell of a BS in a wireless communication system, according to various arrangements.

In NTN, different beam schemes can be supported according to variable requirements. FIG. 1A is a diagram illustrating beams of a cell 100 of a BS in a wireless communication system, according to various arrangements. Referring to FIG. 1A, the BS can be a non-terrestrial BS such as but not limited to, a satellite or an airborne vehicle. The BS shown in the example in FIG. 1A can provide circle-shaped beams 110, 111, 112, 113, 114, 115, and 116. Each of the beams 110-116 forms a coverage area. The UE can transmit data to and receive data from the BS via one of the beams 110-116 while the UE is within the coverage area of that beam. The beams 110-116 (and the coverage areas thereof) collectively form the cell 100.

FIG. 1B is a diagram illustrating beams of a cell of a BS in a wireless communication system, according to various arrangements. Referring to FIG. 1B, the BS can be a non-terrestrial BS such as but not limited to, a satellite or an airborne vehicle. The BS shown in the example in FIG. 1B can provide band-shaped beams 160, 161, 162, and 163. Each of the beams 160-163 forms a coverage area. UEs can transmit data to and receive data from the BS via one of the beams 160-163 while the UE is within the coverage area of that beam. The beams 160-163 (and the coverage areas thereof) collectively form a cell 150.

As shown in FIGS. 1A and 1B, a BS may broadcast at least circle-shaped beams and band-shaped beams. In different areas of a given beam coverage, time and frequency offset for different UEs may be quite different. For example, zero Doppler shift is experienced at the center (or nadir) of the circle-shaped beam, but the Doppler shift at the edge of the circle-shaped beam can be several kHz depending on the beam size. In another example for the band-shaped beam, the time offset due to propagation delay difference experienced at the center (or nadir) and at the beam edge can be larger than the Physical Random Access Channel (PRACH) preamble Cyclic Prefix (CP). These physical impairments can lead to problems with PRACH performance in NTN scenarios. Accordingly, arrangements disclosed herein are directed to enhancing PRACH in NTN.

The time/frequency synchronization among simultaneous UEs is a key point to ensure satisfying PRACH performance, especially for 2-step RACH with a payload in MSG_A. In one embodiment, to reduce time/frequency asynchronization among simultaneous UEs, it is beneficial to divide the coverage of a beam into sub-areas. The UEs in the same sub-area share the same RACH occasions (ROs).

Figure 2:
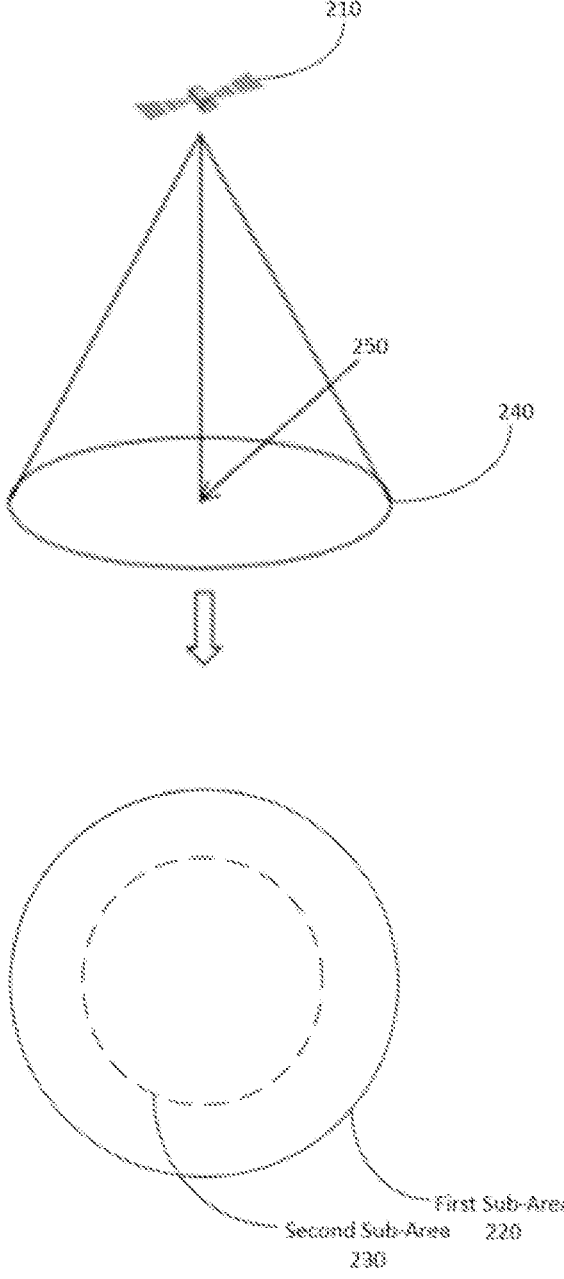
FIG. 2 is a diagram illustrating an example Non-Terrestrial Network cell with a circle-shaped beam, according to various arrangements.

FIG. 2 is a diagram illustrating an example NTN cell with a circle-shaped beam 240 with a nadir 250 as a reference point, according to various arrangements. In this example NTN, the time offset due to propagation delay difference experienced at the nadir and at the beam edge can be larger than the legacy PRACH preamble CP length, and, for a Low-Earth Orbit (LEO)-borne BS 210, the frequency offset due to Doppler shift of the moving BS 210 varies significantly from the nadir 250 to the beam edge. As shown in FIG. 2, the coverage area of the beam 240 can be divided into a first sub-area 220 and a second sub-area 230. UEs in the same sub-area share a similar propagation delay. As such, UEs in the same sub-area should use the same RO resource, while UEs in different sub-areas should use different RO resources.

Figure 3:
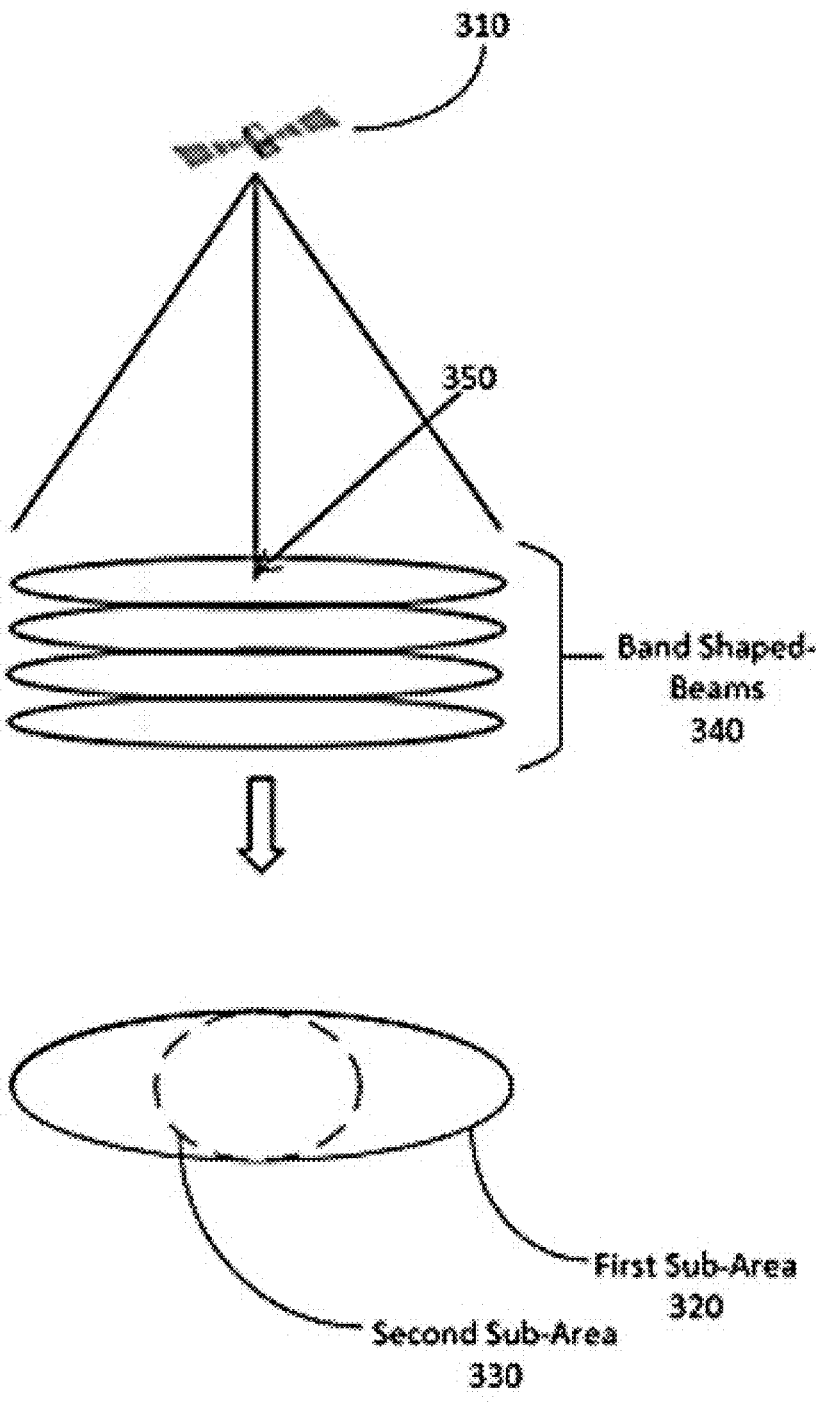
FIG. 3 is a diagram illustrating an example Non-Terrestrial Network cell with 4 band-shaped beams, according to various arrangements.

FIG. 3 is a diagram illustrating an example NTN cell with 4 band-shaped SSB beams 340 from a LEO-borne BS 310 with a symmetrical center 350 of the beams 340 as a reference point, according to various arrangements. In this example NTN, the time offset due to propagation delay different experienced at the symmetrical center 350 and at the beam edge can be larger than the legacy PRACH preamble CP length. As shown in FIG. 3, the coverage of one beam can be divided into a first sub-area 320 and a second sub-area 330. UEs in the same sub-area share a similar propagation delay. As such, UEs in the same sub-area should use the same RO resource, while UEs in different sub-areas should use different RO resources.

In some embodiments, the BS indicates one or more sets of resources for network access (e.g., ROs). The BS then performs a network access procedure (e.g., a RACH procedure) with the UE based on the indicated set of resources. The set of resources for network access may be a PRACH occasion, a PRACH preamble index, or a PUSCH occasion of MSG_A in 2-step RACH. In some embodiments, each of the one or more sets of resources for network access is associated with at least one of a cell, beam, subarea of a beam, UE type, a capability of the UE, or a frequency part of the cell. In other embodiments, the UE receives indication of one or more sets of resources for network access (e.g., ROs), performs measurements, determines the appropriate set of resources, and performs a network access procedure (e.g., RACH procedure) with the BS according to the RO. This method applies to both 2-step RACH and to 4-step RACH. In some embodiments, the coverage splits for sub-areas are based on location, while in other embodiments, the coverage splits for sub-areas are based on time. In other embodiments, the coverage splits for sub-areas are based on frequency offsets.

In a first embodiment for location-based coverage splits, the BS indicates a reference point location of a beam. For example, the reference point can be a nadir (or center) point of the beam, the nearest point in the beam with respect to a pre-determined reference altitude (e.g., sea level) to the airborne BS, or a symmetrical center point of the symmetrical beam. The BS then indicates a distance threshold, which splits the beam coverage into sub-areas. UEs in sub-area 1 would have a distance from the UE to the reference point that is smaller than the distance threshold, while UEs in sub-area 2 would have a distance from the UE to the reference point greater than or equal to (i.e., no less than) the distance threshold. The BS can indicate more than one distance threshold in order to split the beam coverage into more than two sub-areas.

For location-based coverage splits, the measurements performed by the UE include a distance of the UE from the reference point. The UE then determines the appropriate set of resources based on the measurement and a comparison to the threshold, selecting a first resource corresponding to sub-area 1 if the measurement is less than the distance threshold and selecting a second resource corresponding to sub-area 2 if the measurement is greater than or equal to (i.e., no less than) the distance threshold. In some embodiments, the first RO and the second RO are different. In other embodiments, the first RO and the second RO are the same but have different preambles.

Figure 4:
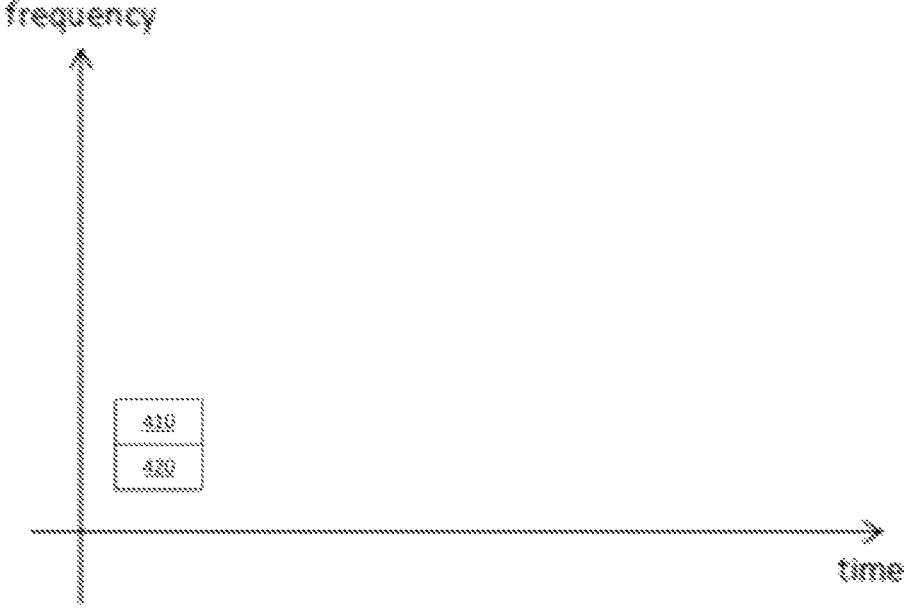
FIG. 4 is a diagram illustrating an example of mapping between ROs and sub-areas, according to various arrangements.

In a second embodiment for location-based coverage splits, the BS indicates the association between RO and sub-area by equally assigning the ROs among sub-areas, which is more efficient and saves signaling over dividing the ROs unequally. FIG. 4 is a diagram illustrating an example of mapping between ROs and sub-areas, according to the second embodiment. The diagram has a time domain as an x-axis and a frequency domain as a y-axis. As shown in FIG. 4, if prach_FDM=2, which means that 2 PRACH resources are configured in frequency domain, and ssb_per_RO=½, which means that 1 Synchronization Signal Block (SSB) is mapped to 2 consecutive ROs, then 2 ROs are available for 2 sub-areas accordingly. A first RO 410 corresponds with a first sub-area, which can be the first sub-areas 220 or 320 from FIGS. 2-3, and a second RO 420 corresponds with a second sub-area, which can be the second sub-areas 230 or 330 from FIGS. 2-3. The first RO 410 and the second RO 420 share a time domain but have different frequency domains. The association between RO and the threshold can be given by the following equation:

$$d < \text{threshold} \rightarrow RO1$$

$$d \geq \text{threshold} \rightarrow RO2 \qquad (1)$$

where d is the distance between a UE's location and the reference point location. Generally, if $N_{sub\text{-}area}$ sub-areas are obtained with given threshold(s), all available ROs are equally assigned among $N_{sub\text{-}area}$ sub-areas.

Sub-area indexes are mapped to ROs according to a particular order. First, sub-area indexes are mapped in increasing order of preamble indexes within a single RO. For example, in one RO, the first sub-area is mapped with the first 10 preambles, the second sub-area is mapped with the second 10 preambles, etc. Second, the sub-area indexes are mapped in increasing order of frequency resource indexes for Frequency Division Multiplexing (FDM) ROs. The second method is used if the first method was insufficient. Third, the sub-area indexes are mapped in increasing order of time resource indexes for Time-Division Multiplexing (TDM) ROs within a PRACH slot. Fourth, the sub-area indexes are mapped in increasing order of indexes for PRACH slots.

Figure 5:
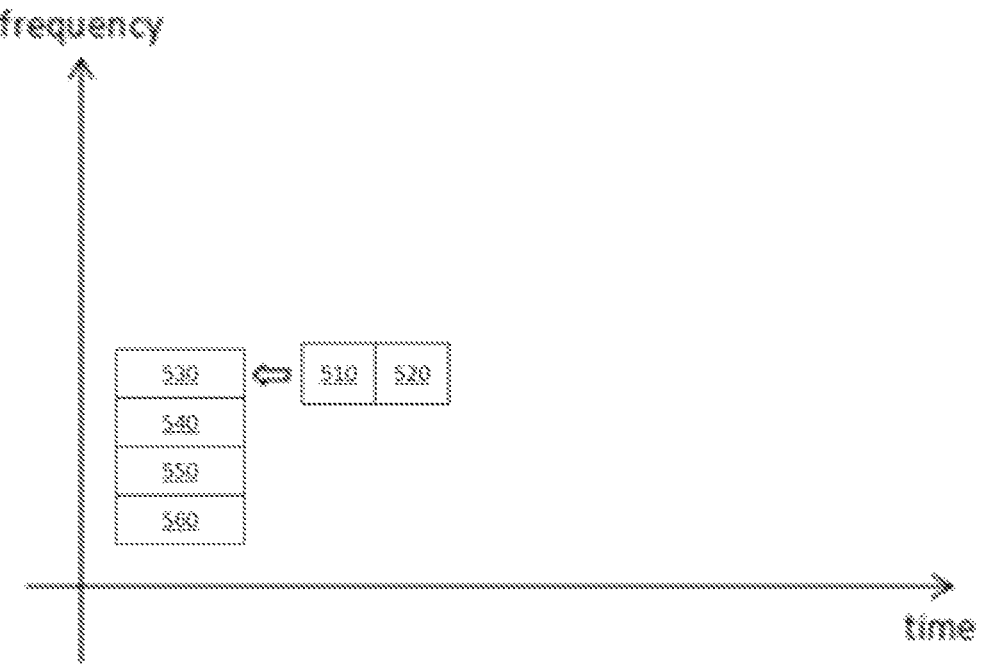
FIG. 5 is a diagram illustrating an example of mapping between Random Access Channel Occasions and sub-areas, according to various arrangements.

In a third embodiment for location-based coverage splits, the BS indicates the association between RO and sub-area by specifying ROs for each sub-area (which may not result in the ROs being assigned equally, as in the second embodiment). FIG. 5 is a diagram illustrating an example of mapping between ROs and sub-areas, according to the third embodiment. The diagram has a time domain as an x-axis and a frequency domain as a y-axis. As shown in FIG. 5, if prach_FDM=4, which means that 4 PRACH resources are configured in frequency domain (given by a first RO 530, a second RO 540, a third RO 550, and a fourth RO 560), and ssb_per_RO=1, which means that 1 SSB is mapped to 1 RO, then only 1 RO is available for 2 sub-areas in SSB1 accordingly. In FIG. 5, a first sub-area 510 and a second sub-area 520 are, thus, correlated to a single RO (here, the first RO 530). The association between RO and the threshold is governed by the following equation:

$$d < \text{threshold} \rightarrow RO1, \text{first } M1 \text{ preambles in the pre-amble pool}$$

$$d \geq \text{threshold} \rightarrow RO1, \text{next } M2 \text{ preambles in the pre-amble pool} \qquad (2)$$

where d is the distance between a UE's location and the reference point location, and where $M_i$ preambles are used for each sub-area i. The sub-area indexes are then mapped to ROs according to a particular order. First, sub-area indexes are mapped in increasing order of preamble indexes within a single RO. For example, in one RO, the first sub-area is mapped with the first 10 preambles, the second sub-area is mapped with the second 10 preambles, etc. Second, the sub-area indexes are mapped in increasing order of frequency resource indexes for Frequency Division Multiplexing (FDM) ROs. The second method is used if the first method was insufficient. Third, the sub-area indexes are mapped in increasing order of time resource indexes for Time-Division Multiplexing (TDM) ROs within a PRACH slot. Fourth, the sub-area indexes are mapped in increasing order of indexes for PRACH slots.

In a fourth embodiment for location-based coverage splits, for a Global Navigation Satellite System (GNSS)-enabled UE (e.g., the UEs in the first-third embodiments) or for a fixed UE with a known location, the UE receives the reference point location of a beam indicated by the BS and determines the distance between the UE's location and the reference point location. The UE then determines the UE's sub-area and corresponding RO resource according to the threshold(s) indicated by the BS.

In a first embodiment for time-based coverage splits, the BS indicates a reference time stamp of common signaling transmission. The reference time stamp may be a time stamp of a synchronization signaling transmission transmitted by the BS or a time stamp of a broadcast signaling transmission transmitted by the BS. The BS then indicates a time threshold, which splits the beam coverage into 2 sub-areas. UEs in sub-area 1 would have a propagation delay smaller than the time threshold, while UEs in sub-area 2 would have a propagation delay greater than or equal to (i.e., no less than) the time threshold. Generally, the BS can indicate more than one time threshold in order to split the beam coverage into more than two sub-areas with different propagation delays.

For time-based coverage splits, the measurements performed by the UE include a propagation delay of the UE with respect to the reference time stamp. The UE then determines the appropriate set of resources based on a comparison of the determined propagation delay for a common signal based on the reference time stamp to the time threshold, selecting a first resource from sub-area 1 if the measurement is less than the time threshold and selecting a second resource from sub-area 2 if the measurement is greater than or equal to (i.e., no less than) the time threshold. In some embodiments, the first RO and the second RO are different. In other embodiments, the first RO and the second RO are the same but have different preambles.

Figure 6:
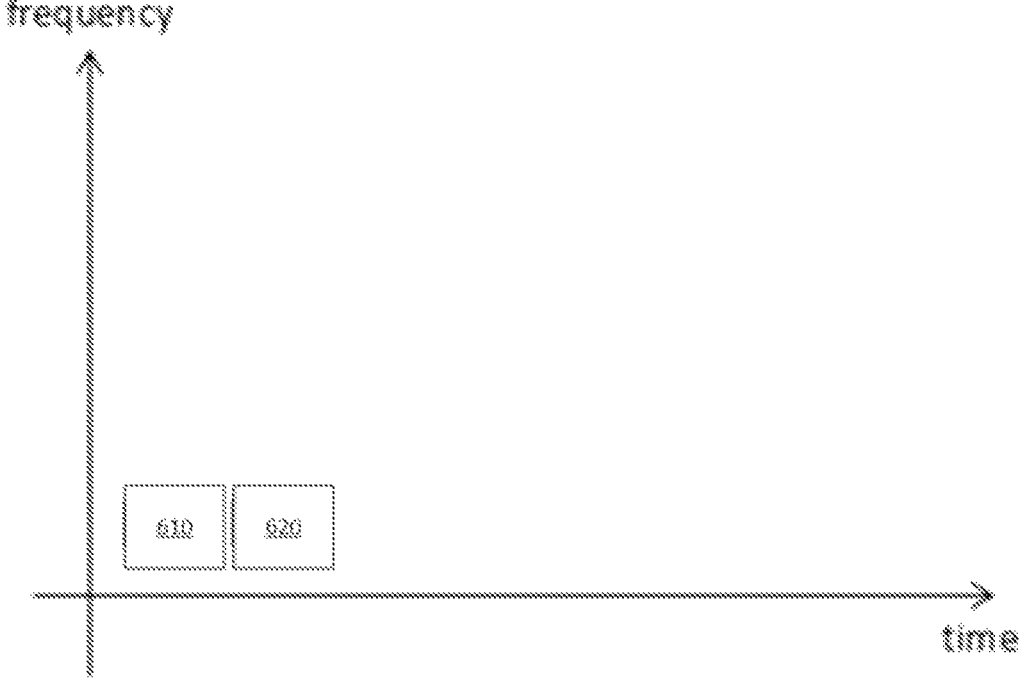
FIG. 6 is a diagram showing an example of mapping between Random Access Channel Occasions and sub-areas, according to various arrangements.

In a second embodiment for time-based coverage splits, the BS indicates the association between RO and sub-area by equally assigning the ROs among sub-areas. FIG. 6 is a diagram showing an example of mapping between ROs and sub-areas, according to the third embodiment. As shown in FIG. 6, if prach_FDM=1, which means that 1 PRACH resource is configured in frequency domain, and ssb_per_RO=1, which means that 1 SSB is mapped to 1 RO, then 2 TDM ROs are available for 2 sub-areas accordingly. In FIG. 6, a first RO 610 is correlated with a first sub-area, which can be the first sub-areas 220 and 320 of FIGS. 2-3, and a second RO 620 is correlated with a second sub-area, which could be the second sub-areas 230 and 330 of FIGS. 2-3. The first RO 610 and the second RO 620 share a frequency domain but have different time domains. The association between RO and the threshold can be given by the following equation:

$$t < \text{threshold} \rightarrow RO1$$

$$t \geq \text{threshold} \rightarrow RO2 \tag{3}$$

where t is the propagation delay between a UE and the BS. Generally, if $N_{sub-area}$ sub-areas are obtained with a given threshold(s), all available ROs are equally assigned among $N_{sub-area}$ sub-areas.

Sub-area indexes are mapped to ROs according to a particular order. First, the sub-area indexes are mapped in increasing order of preamble indexes within a single RO. Second, the sub-area indexes are mapped in increasing order of frequency resource indexes for FDM ROs. Third, the sub-area indexes are mapped in increasing order of time resource indexes for TDM ROs within a PRACH slot. Fourth, the sub-area indexes are mapped in increasing order of indexes for PRACH slots.

In a third embodiment for time-based coverage splits, the BS indicates the association between RO and sub-area by specifying ROs for each sub-area. Referring back to FIG. 5, if prach_FDM=4, which means that 4 PRACH resources are configured in frequency domain, and ssb_per_RO=1, which means that 1 SSB is mapped to 1 RO, then only 1 RO is available for 2 sub-areas in SSB1 accordingly. The association between RO and the threshold can be given by the following equation:

$$t < \text{threshold} \rightarrow RO1, \text{first } M1 \text{ preambles in the pre-amble pool}$$

$$t \geq \text{threshold} \rightarrow RO1, \text{next } M2 \text{ preambles in the pre-amble pool} \tag{4}$$

where t is the propagation delay between a UE and the B S. The sub-area indexes are then mapped to ROs according to a particular order. First, the sub-area indexes are mapped in increasing order of preamble indexes within a single RO. Second, the sub-area indexes are mapped in increasing order of frequency resource indexes for FDM ROs. Third, the sub-area indexes are mapped in increasing order of time resource indexes for TDM ROs within a PRACH slot. Fourth, the sub-area indexes are mapped in increasing order of indexes for PRACH slots. Generally, if $N_{sub-area}$ sub-areas are obtained with a given threshold(s), then all ROs are assigned according to $M_i$ values indicated by the BS for each sub-area.

In a fourth embodiment for time-based coverage splits, for a UE with synchronized timing with the BS, the UE receives the common signal with a transmitting time stamp and determines the propagation delay between its receiving time and the transmission time. The UE then determines its sub-area and corresponding RO resource according to the threshold(s) indicated by the BS.

In a first embodiment for frequency offset-based coverage splits, in applications in which the UEs and BS share the same external timing system (e.g., GPS timing), the BS indicates reference time stamps of common signaling transmission (e.g., synchronization/broadcast). The BS also indicates a frequency offset threshold, which splits the beam coverage into 2 sub-areas. UEs in sub-area 1 have a frequency offset less than the frequency offset threshold, while UEs in sub-area 2 have a frequency offset greater than or equal to (i.e., no less than) the frequency offset. Generally, the BS can indicate more than one frequency offset threshold in order to split the beam coverage into more than two sub-areas with different frequency offsets.

For frequency offset-based coverage splits, the measurements performed by the UE include a frequency offset of the UE with respect to the reference time stamp. The UE determines the appropriate set of resources based on a comparison of the determined frequency offset to the frequency offset threshold, selecting a first resource of sub-area 1 if the measurement is less than the frequency offset threshold and selecting a second resource of sub-area 2 if the measurement is greater than or equal to (i.e., no less than) the frequency offset threshold. In some embodiments, the first RO and the second RO are different. In other embodiments, the first RO and the second RO are the same but have different preambles.

In a second embodiment for frequency offset-based coverage splits, the BS indicates the association between RO and sub-area by equally assigning the ROs among sub-areas. Referring back to FIG. 6, if prach_FDM=1, which means that 1 PRACH resource is configured in frequency domain, and ssb_per_RO=1, which means that 1 SSB resource is mapped to 1 RO, then 2 TDM ROs (e.g., first RO 610 and second RO 620) are available for 2 sub-areas accordingly. The association between RO and the threshold can be given by the following equation:

$$fo < \text{threshold} \rightarrow RO1$$

$$fo \geq \text{threshold} \rightarrow RO2 \tag{5}$$

where fo is the frequency offset estimated by the UE. Generally, if $N_{sub\ area}$ sub-areas are obtained with given threshold(s), all available ROs are equally assigned among $N_{sub\ area}$ sub-areas.

Sub-area indexes are mapped to ROs in a particular order. First, sub-area indexes are mapped in increasing order of preamble indexes within a single RO. Second, sub-area indexes are mapped in increasing order of frequency resource indexes for FDM ROs. Third, sub-area indexes are mapped in increasing order of time resource indexes for TDM ROs within a PRACH slot. Fourth, the sub-area indexes are mapped in increasing order of indexes for PRACH slots.

In a third embodiment for frequency offset-based coverage splits, the BS indicates the association between RO and sub-area by specifying ROs for each sub-area. Referring back to FIG. 5, prach_FDM=4, which means that 4 PRACH resources are configured in frequency domain, and ssb_per_RO=1, which means that 1 SSB is mapped to 1 RO, then only 1 RO is available for 2 sub-areas in SSB1 accordingly (e.g., sub-areas 510 and 520 for first RO 530). The association between RO and the threshold can be given by the following equation:

$$fo < \text{threshold} \rightarrow RO1, \text{first } M1 \text{ preambles in the pre-amble pool}$$

$$fo \geq \text{threshold} \rightarrow RO1, \text{next } M2 \text{ preambles in the pre-amble pool} \tag{6}$$

where fo is the frequency offset estimated by the UE. The sub-area indexes are then mapped to ROs according to a particular order. First, sub-area indexes are mapped in increasing order of preamble indexes within a single RO. Second, sub-area indexes are mapped in increasing order of frequency resource indexes for FDM ROs. Third, sub-area indexes are mapped in increasing order of time resource indexes for TDM ROs within a PRACH slot. Fourth, the sub-area indexes are mapped in increasing order of indexes for PRACH slots. Generally, if $N_{sub-area}$ sub-areas are obtained with a given threshold(s), all ROs are assigned according to $M_i$ values indicated by the BS for each sub-area.

In a fourth embodiment for frequency offset-based coverage splits, the BS indicates a pre-compensated frequency offset corresponding to a given reference point location of a beam. For example, the reference point can be a nadir (or center) point of the beam. In another example, the reference point can be the symmetrical center point of a symmetrical beam shape.

In a fifth embodiment, when UEs and the BS share the same external timing system (e.g., GPS timing), the UE receives multiple common signals transmitted by the BS and estimates the frequency offset experienced by comparing the receiving time gap and the indicated time stamp gap between multiple common signals. The UE receives the (optionally) existing pre-compensated frequency offset indicated by the BS. The total frequency offset is calculated by summing up the UE's estimated frequency offset and the BS's pre-compensated frequency offset. The UE determines the UE's sub-area and corresponding RO resource according to the threshold(s) indicated by the BS.

Figure 7:
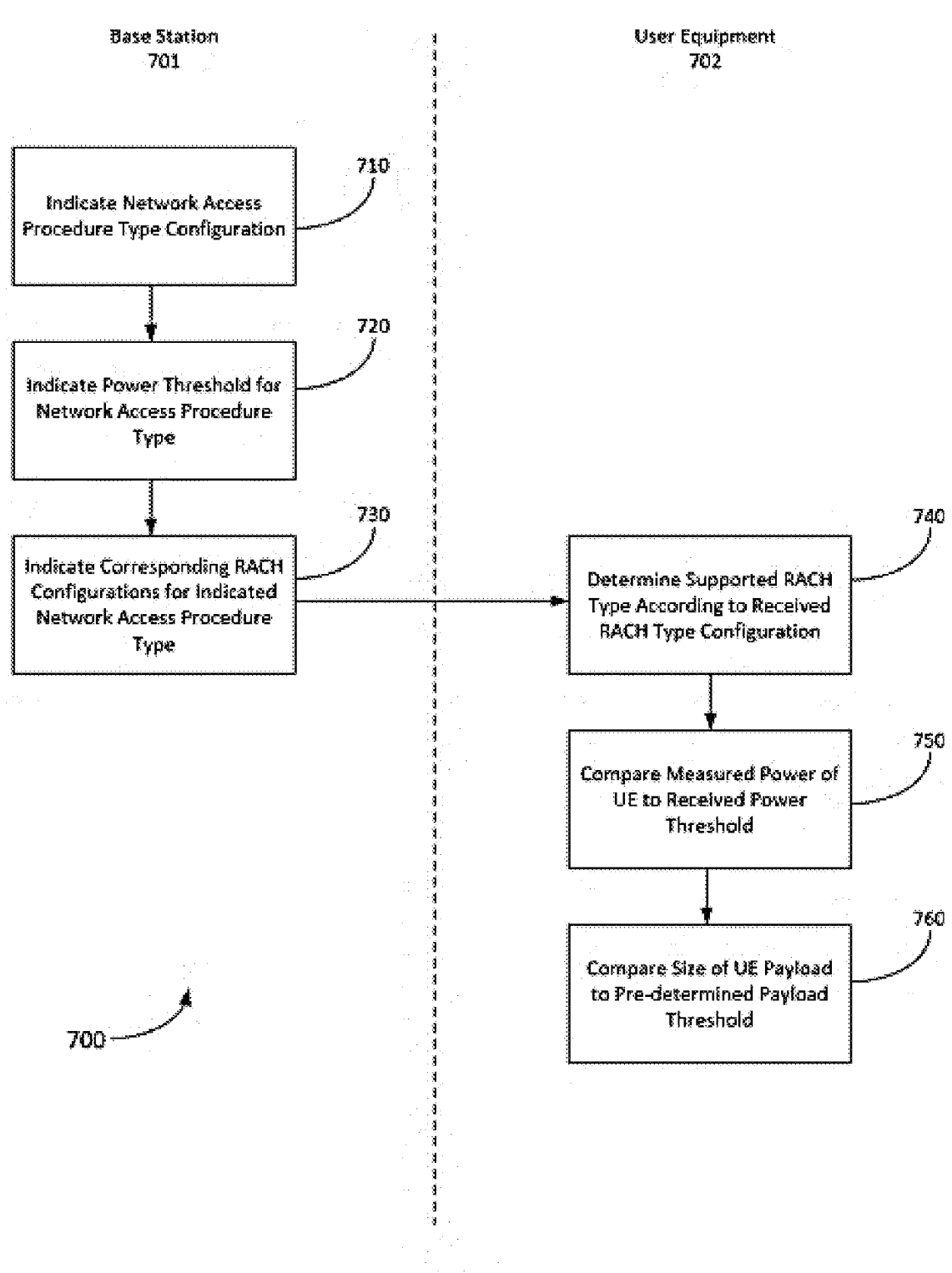
FIG. 7 is a flowchart diagram illustrating an example method for determining a Random Access Channel type, according to various arrangements.

The BS can indicate the PRACH configuration for either 2-step RACH or 4-step RACH according to several embodiments. FIG. 7 is a flowchart diagram illustrating an example method 700 for determining a RACH type, according to various arrangements. As shown in FIG. 7, the method 700 is performed by a Base Station (e.g., a non-terrestrial BS) 701 and a User Equipment 702. The BS 701 indicates network access procedure (e.g., RACH) type configuration (i.e., 2-step RACH and/or 4-step RACH), which can be a RACH type flag in common signaling at step 710. The BS 701 also indicates one or more Reference Signal Received Power (RSRP) thresholds for each network access procedure type at step 720. Each RSRP threshold is associated with a payload size threshold, which is pre-determined or indicated by the BS. Steps 710 and 720 can occur concurrently or in any order (e.g., 710 before 720 or 720 before 710). The BS 701 then indicates, at step 730, the corresponding RACH configurations for indicated network access procedure type, respectively. The extra configurations of 2-step RACH include time-frequency resource of ROs and the association with Physical Uplink Shared Channel (PUSCH) occasions (POs). The POs configuration includes one or more sets of time-frequency resource for different payload sizes. The association between RSRP thresholds, time-frequency resource sets, and payload size is pre-determined. Next at step 740, the UE 702 determines the supported RACH type according to the received RACH type configuration and the one or more received RSRPs. The UE 702 then uses a 2-step RACH if the UE's RSRP measurement (i.e., the measured power of the UE) is higher than the received RSRP threshold at step 750 and if the UE's payload size is below a payload size threshold associated with the largest power threshold that is lower than the measured power at step 760. If both conditions are met, the UE selects the set of time-frequency resource associated with the largest power threshold which is lower than the measured power.

In a second embodiment, requirements on UE capability may be pre-determined or indicated by BS and include at least one of GNSS, UE type, timing, pre-compensation, and/or local oscillator accuracy. A UE without GNSS or the UE's location information directly uses the 4-step RACH resource indicated by the BS, according to pre-determined or indicated restrictions. These restrictions or requirements on UE capability include one or more of location capabilities, UE type, timing, UE pre-compensation, or a local oscillator accuracy. An airborne type UE directly uses the 4-step RACH resource indicated by the BS, according to the pre-determined restrictions. A UE without synchronized timing with the BS directly uses the 4-step RACH resource indicated by the BS, according to the pre-determined restrictions. A UE without time and/or frequency pre-compensation directly uses the 4-step RACH resource indicated by the BS, according to the pre-determined restrictions. A UE without a sufficiently accurate/stable local oscillator directly uses the 4-step RACH resource indicated by the BS, according to the pre-determined restrictions. The local oscillator is determined to be sufficiently accurate based on pre-determined criteria (e.g., I.O frequency offset>10 ppm).

Figure 8:
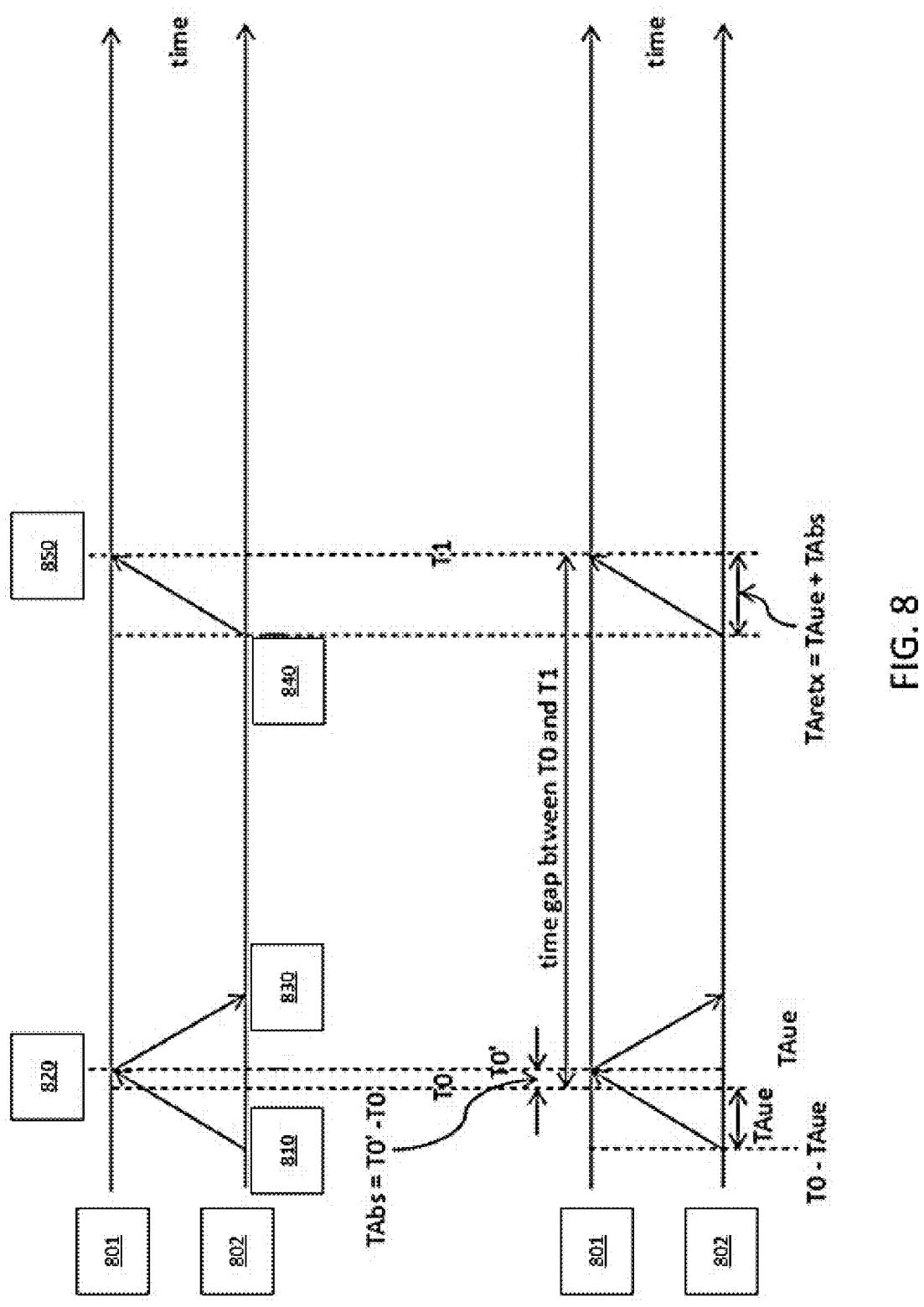
FIG. 8 is a diagram illustrating an example timeline of fallback to 4-step Random Access Channel (RACH), according to various arrangements.

If there is a partial or complete failure of the transmission at a 2-step RACH, there is a fallback from 2-step RACH to the 4-step RACH if MSG_A preamble part is successfully detected but the payload detection fails. FIG. 8 is a diagram illustrating an example timeline of fallback to 4-step RACH, according to various arrangements. FIG. 8 has the time domain as an x-axis. The UE 802 transmits MSG_A at 810 to BS 802. The time of 810 is given as T0-TA$_{UE}$, where TO is the expected reception time of MSG_A by the BS and TA$_{UE}$ is the time advance pre-compensated by the UE. At 820, the BS 801 receives MSG_A and transmits the fallback RAR, which indicates the residual TA (TA$_{BS}$). TA$_{BS}$ is equal to T0'−T0, where T0' is the actual reception time (820, in FIG. 8) of MSG_A by the BS. As such, TA$_{BS}$ is equal to the gap between the actual and expected reception times of MSG_A by the BS. At 830, the UE 802 receives the fallback RAR. The UE 802 transmits the payload re-transmission at 840, and the payload re-transmission is expected to be received by the BS 801 at 850 (or T1). The value of T1−T0 should be greater than or equal to:

$$\frac{TA_{BS} + RTT}{2 + TA_{RETX}} \tag{7}$$

where RTT is the Round Trip Time, and TA$_{RETX}$ is equal to the sum of TA$_{UE}$ and TA$_{BS}$. Because both RTT and TA$_{UE}$ are unknown to the BS due to the failed payload detection, the values for both should be set to the maximum possible value. The maximum RTT is known by the BS based on the BS beam deployment. The maximum $\text{TA}_{UE}$ is equal to half of the maximum RTT. As such, the value of T1–T0 should be greater than or equal to:

$$2*\text{TA}_{BS}+\max(\text{RTT}) \quad\quad (8)$$

The time-frequency resource indicated in the fallback RAR for payload re-transmission should follow this restriction. The value of max(RTT) can be either indicated by the BS in common signal/dedicated signal to UE(s) or pre-determined and known by the BS and UE(s).

Figure 9:
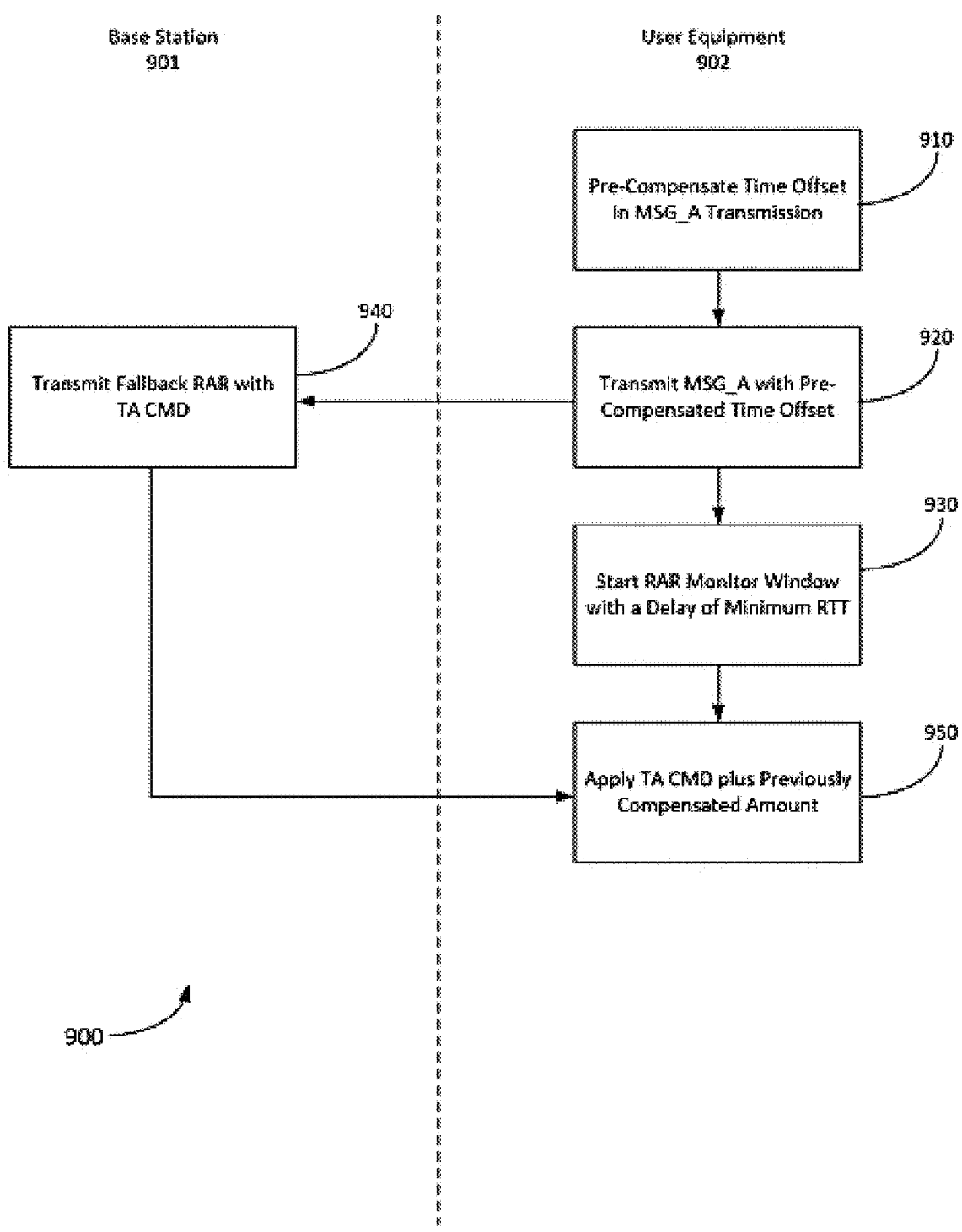
FIG. 9 is a flowchart diagram illustrating an example method for determining and applying a Timing Advance, according to various arrangements.

The Timing Advance (TA) in payload re-transmission in case of fallback to 4-step RACH is determined and a timing advance command (TA CMD) is transmitted by the BS to the UE. FIG. 9 is a flowchart diagram illustrating an example method 900 for determining and applying TA. As shown in FIG. 9, the method 900 is performed by a Base Station (e.g., a non-terrestrial BS) 901 and a User Equipment 902. At step 910, the UE 902 pre-compensates the UE's time offset in MSG_A transmission and includes the pre-compensated time value (i.e., $\text{TA}_{UE}$) in the MSG_A payload. The UE 902 then transmits, at step 920, the MSG_A with pre-compensated time offset. The UE 902 starts, at step 930, the UE's Random Access Response (RAR) monitor window with a delay of minimum RTT, which is either determined by BS 901 indication, pre-determined, or calculated by the UE 902. Steps 920 and 930 can occur concurrently or in any order (e.g., 920 before 930 or 930 before 920). Next, the BS 901 transmits a fallback RAR at step 940, if the MSG_A payload detection fails. The pre-compensated time value applied by the UE 902 is unknown to the BS in this case. In the fallback RAR, a time-frequency resource for re-transmission of payload is indicated. The time between when the BS 901 receives the payload re-transmission (i.e., T1) and when the BS 901 expects to receive MSG_A (i.e., T0) is greater than or equal to the value of Formula 7. A TA CMD (i.e., $\text{TA}_{BS}$) is included in the fallback RAR with an assumption of zero pre-compensated time at the UE 902 side. The UE 902 then applies, at step 950, the indicated TA CMD plus a previously compensated amount.

Figure 10:
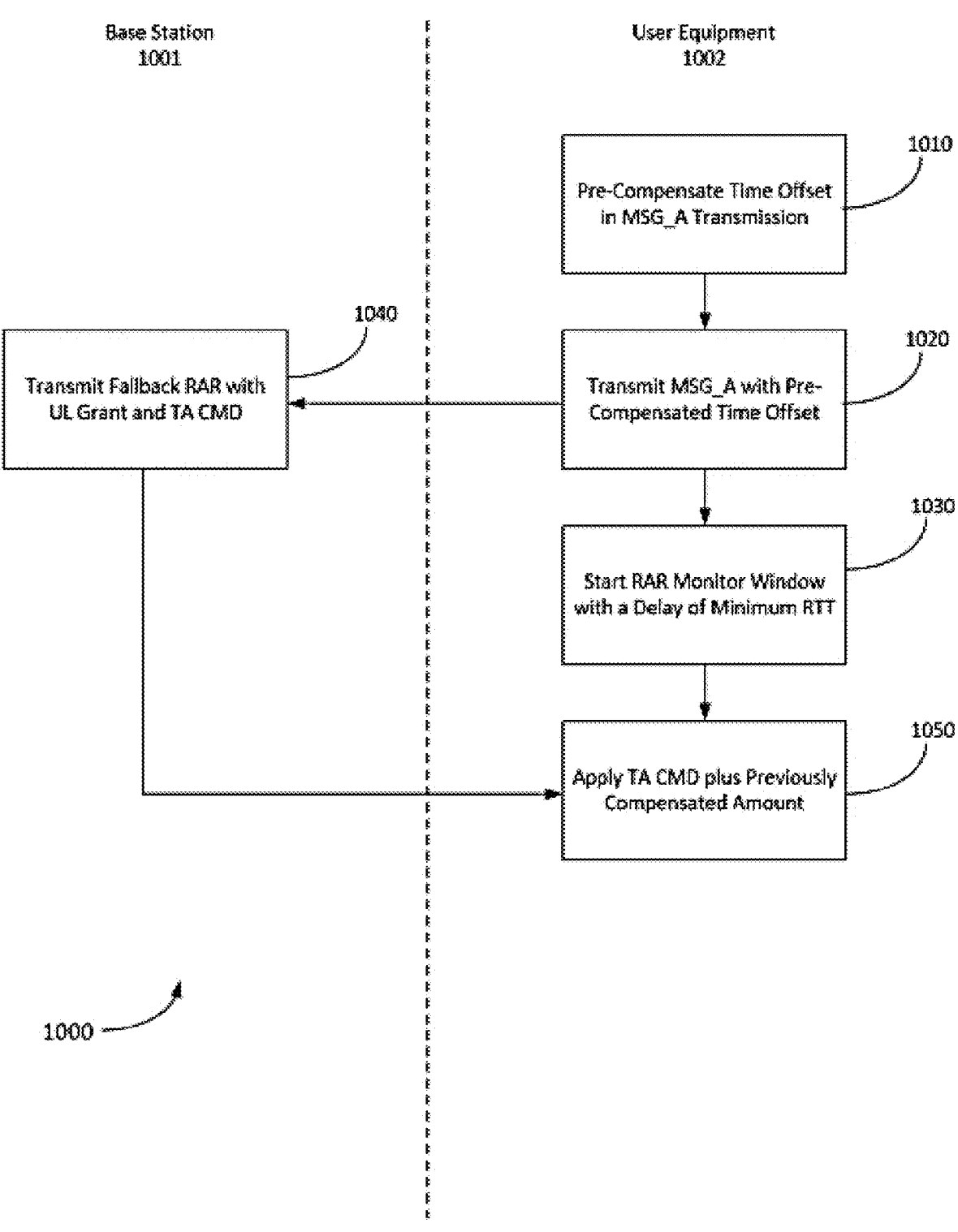
FIG. 10 is a flowchart diagram illustrating an example method for determining and applying a Timing Advance, according to various arrangements.

If the 2-step RACH is successful, there may still be a TA following the Uplink (UL) transmission. FIG. 10 is a flowchart diagram illustrating an example method 1000 for determining and applying a TA. As shown in FIG. 10, the method 1000 is performed by a Base Station (e.g., a non-terrestrial BS) 1001 and a User Equipment 1002. At step 1010, the UE 1002 pre-compensates the UE's time offset in MSG_A transmission and includes the pre-compensated time value in the MSG_A payload. The UE 1002 then transmits, at step 1020, the MSG_A with pre-compensated time offset. The UE 1002 starts the UE's RAR monitor window with a delay of minimum RTT at step 1030, which is either determined by BS indication or pre-determined. Steps 1020 and 1030 can occur concurrently or in any order (e.g., 1020 before 1030 or 1030 before 1020). Next, the BS 1001 transmits, at step 1040, a RAR message to the UE 1002, which indicates successful detection of MSG_A and includes a UL grant for after the UL transmission. A TA CMD is included in the UL grant and is an extra adjustment based on the UE's pre-compensated time offset included in the UE's MSG_A payload. This adjustment differs from the adjustment provided when the 2-step RACH fails because the pre-compensated time offset is known to the BS 1001 in the case of a successful 2-step RACH, while the value pre-compensated time offset is unknown to but determinable for the BS 1001 in the case of an unsuccessful 2-step RACH. At step 1050, the UE 1002 then applies a TA value in the following UL transmission using the indicated UL grant, if the UE 1002 successfully receives the RAR. The TA value is the sum of the UE's pre-compensated time offset included in the UE's MSG_A payload and the TA CMD value indicated by the BS 1001 in the RAR.

FIG. 11A is a flowchart diagram illustrating an example wireless communication method 1100 for RACH occasions, according to various arrangements. Referring to FIGS. 2-3 and 7-9, the method 1100 can be performed by a BS (e.g., a non-terrestrial BS described herein). Method 1100 begins at step 1110 where the BS indicates, to a wireless communication device (e.g., UE), at least one set of resources for network access. Then, at step 1120, the BS performs a network access procedure with the UE based on the indicated set of resources for network access.

FIG. 11B is a flowchart diagram illustrating an example wireless communication method 1150 for RACH occasions, according to various arrangements. Referring to FIGS. 7-10, the method 1150 can be performed by a UE. The method 1150 begins at step 1160, wherein the UE receives, from a BS, indication of at least one set of resources for network access. At step 1170, the UE determines a selected set of resources for network access based on measurements performed by the UE. Then, at step 1180, the UE performs a network access procedure with the BS based on the selected set of resources.

Figure 12B:
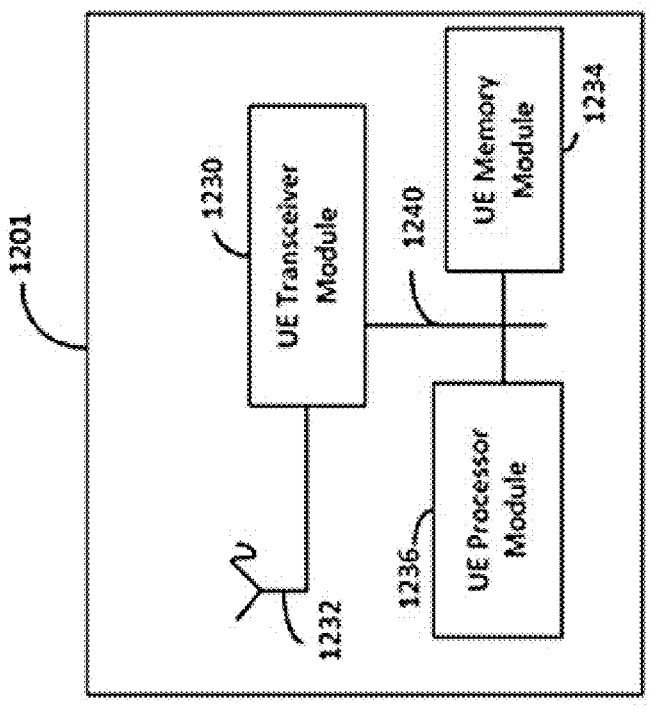
FIG. 12B illustrates a block diagram of an example User Equipment, according to various arrangements.
Figure 12A:
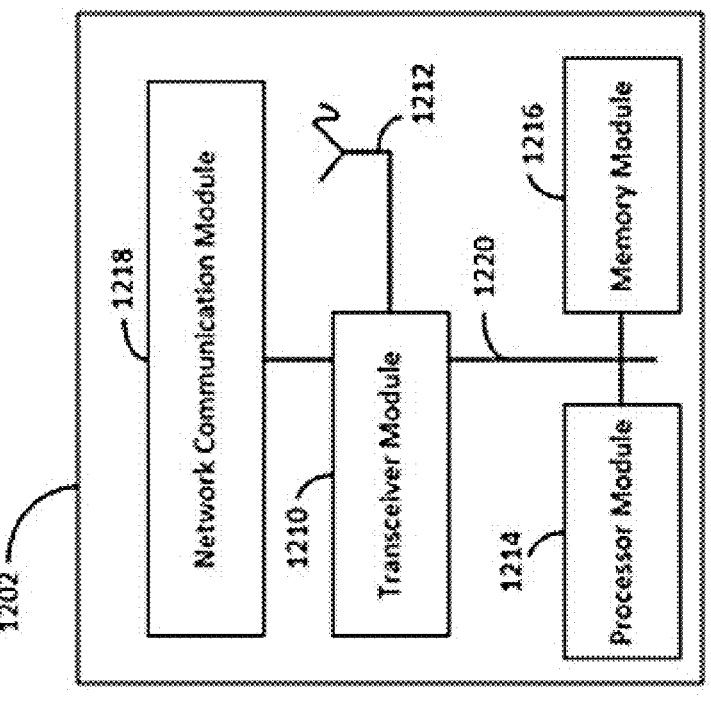
FIG. 12A illustrates a block diagram of an example Base Station, according to various arrangements.

FIG. 12A illustrates a block diagram of an example BS 1202 (e.g., a non-terrestrial BS described herein), in accordance with some embodiments of the present disclosure. FIG. 12B illustrates a block diagram of an example UE 1201, in accordance with some embodiments of the present disclosure. Referring to FIGS. 1-12B, the UE 1201 (e.g., a wireless communication device, a terminal, a mobile device, a mobile user, and so on) is an example implementation of the UEs described herein, and the BS 1202 is an example implementation of the BS described herein.

The BS 1202 and the UE 1201 can include components and elements configured to support known or conventional operating features that need not be described in detail herein. In one illustrative embodiment, the BS 1202 and the UE 1201 can be used to communicate (e.g., transmit and receive) data symbols in a wireless communication environment, as described above. For instance, the BS 1202 can be a BS (e.g., gNB, eNB, and so on), a server, a node, or any suitable computing device used to implement various network functions.

The BS 1202 includes a transceiver module 1210, an antenna 1212, a processor module 1214, a memory module 1216, and a network communication module 1218. The module 1210, 1212, 1214, 1216, and 1218 are operatively coupled to and interconnected with one another via a data communication bus 1220. The UE 1201 includes a UE transceiver module 1230, a UE antenna 1232, a UE memory module 1234, and a UE processor module 1236. The modules 1230, 1232, 1234, and 1236 are operatively coupled to and interconnected with one another via a data communication bus 1240. The BS 1202 communicates with the UE 1201 or another BS via a communication channel, which can be any wireless channel or other medium suitable for transmission of data as described herein.

As would be understood by persons of ordinary skill in the art, the BS 1202 and the UE 1201 can further include any number of modules other than the modules shown in FIGS. 12A and 12B. The various illustrative blocks, modules, circuits, and processing logic described in connection with the embodiments disclosed herein can be implemented in hardware, computer-readable software, firmware, or any practical combination thereof. To illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. The embodiments described herein can be implemented in a suitable manner for each particular application, but any implementation decisions should not be interpreted as limiting the scope of the present disclosure.

In accordance with some embodiments, the UE transceiver 1230 includes a radio frequency (RF) transmitter and a RF receiver each including circuitry that is coupled to the antenna 1232. A duplex switch (not shown) may alternatively couple the RF transmitter or receiver to the antenna in time duplex fashion. Similarly, in accordance with some embodiments, the transceiver 1210 includes an RF transmitter and a RF receiver each having circuitry that is coupled to the antenna 1212 or the antenna of another BS. A duplex switch may alternatively couple the RF transmitter or receiver to the antenna 1212 in time duplex fashion. The operations of the two-transceiver modules 1210 and 1230 can be coordinated in time such that the receiver circuitry is coupled to the antenna 1232 for reception of transmissions over a wireless transmission link at the same time that the transmitter is coupled to the antenna 1212. In some embodiments, there is close time synchronization with a minimal guard time between changes in duplex direction.

The UE transceiver 1230 and the transceiver 1210 are configured to communicate via the wireless data communication link, and cooperate with a suitably configured RF antenna arrangement 1212/1232 that can support a particular wireless communication protocol and modulation scheme. In some illustrative embodiments, the UE transceiver 1230 and the transceiver 1210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 1230 and the BS transceiver 1210 may be configured to support alternate, or additional, wireless data communication protocols, including future standards or variations thereof.

The transceiver 1210 and the transceiver of another BS (such as but not limited to, the transceiver 1210) are configured to communicate via a wireless data communication link, and cooperate with a suitably configured RF antenna arrangement that can support a particular wireless communication protocol and modulation scheme. In some illustrative embodiments, the transceiver 1210 and the transceiver of another BS are configured to support industry standards such as the LTE and emerging 5G standards, and the like. It is understood, however, that the present disclosure is not necessarily limited in application to a particular standard and associated protocols. Rather, the transceiver 1210 and the transceiver of another BS may be configured to support alternate, or additional, wireless data communication protocols, including future standards or variations thereof.

In accordance with various embodiments, the BS 1202 may be a BS such as but not limited to, an eNB, a serving eNB, a target eNB, a femto station, or a pico station, for example. The BS 1202 can be an RN, a DeNB, or a gNB. In some embodiments, the UE 1201 may be embodied in various types of user devices such as a mobile phone, a smart phone, a personal digital assistant (PDA), tablet, laptop computer, wearable computing device, etc. The processor modules 1214 and 1236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the method or algorithm disclosed herein can be embodied directly in hardware, in firmware, in a software module executed by processor modules 1214 and 1236, respectively, or in any practical combination thereof. The memory modules 1216 and 1234 may be realized as RAM memory, flash memory, ROM memory, EPROM memory, EEPROM memory, registers, a hard disk, a removable disk, a CD-ROM, or any other form of storage medium known in the art. In this regard, memory modules 1216 and 1234 may be coupled to the processor modules 1214 and 1236, respectively, such that the processors modules 1214 and 1236 can read information from, and write information to, memory modules 1216 and 1234, respectively. The memory modules 1216 and 1234 may also be integrated into their respective processor modules 1214 and 1236. In some embodiments, the memory modules 1216 and 1234 may each include a cache memory for storing temporary variables or other intermediate information during execution of instructions to be executed by processor modules 1214 and 1236, respectively. Memory modules 1216 and 1234 may also each include non-volatile memory for storing instructions to be executed by the processor modules 1214 and 1236, respectively.

The network communication module 1218 generally represents the hardware, software, firmware, processing logic, and/or other components of the BS 1202 that enable bidirectional communication between the transceiver 1210 and other network components and communication nodes in communication with the BS 1202. For example, the network communication module 1218 may be configured to support internet or WiMAX traffic. In a deployment, without limitation, the network communication module 1218 provides an 802.3 Ethernet interface such that the transceiver 1210 can communicate with a conventional Ethernet based computer network. In this manner, the network communication module 1218 may include a physical interface for connection to the computer network (e.g., Mobile Switching Center (MSC)). In some embodiments, the network communication module 1218 includes a fiber transport connection configured to connect the BS 1202 to a core network. The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method, comprising:
   indicating, by a base station to a wireless communication device, at least one set of resources for network access by indicating:
   a reference point of a beam of a cell of the base station; and
   one or more distance thresholds, wherein the beam comprises a plurality of subareas, each of the plurality of subareas is mapped to a time-domain resource of a plurality of time-domain resources according to an order, the at least one set of resources comprises at least one of the plurality of time-domain resources; and performing, by the base station, a network access proce-
dure with the wireless communication device based on
the at least one indicated set of resources for network
access.

2. The method of claim 1, wherein the resources for
network access include at least one of:
a PRACH occasion;
a PRACH preamble index; or
a PUSCH occasion of MSG_A in 2-step RACH.

3. The method of claim 1, wherein each of the at least one
set of resources for network access is associated with at least
one of:
the cell of the base station, the beam of the cell, a subarea
of the plurality of subareas of the beam, a type of the
wireless communication device, a capability of the
wireless communication device, or a frequency part of
the cell.

4. The method of claim 1, wherein the reference point
comprises one of:
a nadir point of the beam;
a nearest point to the base station; or
a symmetrical center point of the symmetrical beam.

5. The method of claim 1, further comprising indicating,
by the base station, via network access procedure type
configurations, one or more power thresholds for selection
of multiple network access procedure types.

6. The method of claim 5, wherein each of the one or more
power thresholds is associated with a payload size threshold,
the payload size threshold predetermined or indicated by the
base station.

7. The method of claim 1, further comprising transmitting,
by the base station to the wireless communication device, a
Timing Advance Command (TA CMD) in falling back from
a first type of the network access procedure to a second type
of the network access procedure.

8. The method of claim 1, further comprising indicating,
by the base station to the wireless communication device, a
mapping between the plurality of time-domain resources and
the plurality of subareas, wherein the mapping comprises
equally assigning the plurality of time-domain resources
among the plurality of subareas in the frequency domain.

9. The method of claim 1, wherein indexes of the plurality
of subareas are mapped in an increasing order of frequency
resource indexes of the plurality of time-domain resources,
and wherein the plurality of time-domain resources is Fre-
quency Division Multiplexed (FDMed).

10. The method of claim 1, wherein the order comprises:
first, indexes of the plurality of subareas are mapped in
increasing order of preamble indexes within one time-
domain resource;
second, the indexes of the plurality of subareas are
mapped in an increasing order of frequency resource
indexes of Frequency Division Multiplexed (FDMed)
time-domain resources; and
third, the indexes of the plurality of subareas are mapped
in an increasing order of time resource indexes of
Time-Division Multiplexing (TDM) time-domain
resources within another time-domain resource.

11. The method of claim 1, further comprising indicating,
by the base station to the wireless communication device, a
mapping between the plurality of time-domain resources and
the plurality of subareas, wherein the mapping comprises
unequally assigning the plurality of time-domain resources
among the plurality of subareas.

12. The method of claim 1, further comprising indicating,
by the base station to the wireless communication device, a
mapping between the plurality of time-domain resources and the plurality of subareas, wherein the mapping comprises
equally assigning the plurality of time-domain resources
among the plurality of subareas in the time domain.

13. A wireless communication method, comprising:
receiving, by a wireless communication device from a
base station, an indication of at least one set of
resources for network access, the indication compris-
ing:
a reference point of a beam of a cell of the base station;
and
one or more distance thresholds, wherein the beam
comprises a plurality of subareas, each of the plu-
rality of subareas is mapped to a time-domain
resource of a plurality of time-domain resources
according to an order, the at least one set of resources
comprises at least one of the plurality of time-
domain resources;
determining, by the wireless communication device, a
selected set of resources based on measurements per-
formed by the wireless communication device; and
performing, by the wireless communication device, a
network access procedure with the base station based
on the selected set of resources.

14. The method of claim 13, wherein the resources for
network access include at least one of:
a PRACH occasion;
a PRACH preamble index; or
a PUSCH occasion of MSG_A in 2-step RACH.

15. The method of claim 13, wherein each of the at least
one set of resources for network access is associated to at
least one of:
the cell of the base station, the beam of the cell, a subarea
of the plurality of subareas of the beam, a type of the
wireless communication device, a capability of the
wireless communication device, or a frequency part of
the cell.

16. A base station, comprising:
at least one processor configured to:
send, via a transmitter to a wireless communication
device, an indication of at least one set of resources
for network access, the indication comprises:
a reference point of a beam of a cell of the base
station; and
one or more distance thresholds, wherein the beam
comprises a plurality of subareas, each of the
plurality of subareas is mapped to a time-domain
resource of a plurality of time-domain resources
according to an order, the at least one set of
resources comprises at least one of the plurality of
time-domain resources; and
perform a network access procedure with the wireless
communication device based on the at least one
indicated set of resources for network access.

17. A wireless communication device, comprising:
at least one processor configured to:
receive, via a receiver from a base station, an indication
of at least one set of resources for network access,
the indication comprising:
a reference point of a beam of a cell of the base
station; and
one or more distance thresholds, wherein the beam
comprises a plurality of subareas, each of the
plurality of subareas is mapped to a time-domain
resource of a plurality of time-domain resources
according to an order, the at least one set of
resources comprises at least one of the plurality of
time-domain resources;

determine a selected set of resources based on measurements performed by the wireless communication device; and perform a network access procedure with the base station based on the selected set of resources.

* * * * *